(12) United States Patent
Avganim

(10) Patent No.: US 11,560,737 B2
(45) Date of Patent: Jan. 24, 2023

(54) SECURITY BRACKET FOR LAPTOP COMPUTERS

(71) Applicant: Meir Avganim, Gealya (IL)

(72) Inventor: Meir Avganim, Gealya (IL)

( * ) Notice: Subject to any disclaimer, the term of this patent is extended or adjusted under 35 U.S.C. 154(b) by 332 days.

(21) Appl. No.: 16/997,063

(22) Filed: Aug. 19, 2020

(65) Prior Publication Data

US 2021/0062555 A1 Mar. 4, 2021

Related U.S. Application Data

(60) Provisional application No. 62/891,891, filed on Aug. 26, 2019.

(51) Int. Cl.
*E05B 73/00* (2006.01)
*G06F 1/16* (2006.01)
*B66F 15/00* (2006.01)

(52) U.S. Cl.
CPC .......... *E05B 73/0082* (2013.01); *B66F 15/00* (2013.01); *G06F 1/1679* (2013.01)

(58) Field of Classification Search
CPC ..... E05B 73/0082; B66F 15/00; G06F 1/1679

USPC ................ 81/44; 70/14, 57, 58, 49
See application file for complete search history.

(56) References Cited

U.S. PATENT DOCUMENTS

| | | | | |
|---|---|---|---|---|
| 5,076,079 A | * | 12/1991 | Monoson | E05B 73/0005 248/680 |
| 7,971,458 B2 | * | 7/2011 | Gilbert | E05B 73/0082 248/552 |
| 8,230,707 B2 | * | 7/2012 | Hung | E05B 73/0082 70/58 |
| 9,476,229 B2 | | 10/2016 | Avganim | |
| 9,549,476 B2 | | 1/2017 | Avganim | |

* cited by examiner

*Primary Examiner* — Joseph J Hail
*Assistant Examiner* — Shantese L McDonald
(74) *Attorney, Agent, or Firm* — Ostrolenk Faber LLP

(57) ABSTRACT

A security kit is provided that enables retrofitting a mobile electronic device with a theft preventing security slot. The slot allows locking therein a lock head, a cable of which is attachable to an immovable object. The security kit includes a security bracket having an attachment plate with a screw hole formed therein, and having a thickened portion having a security slot formed therein. A fork-shaped screw extracting tool is used to extract from the mobile electronic device one of the body screws and then re-use it to attach the security bracket to the housing of the electronic device.

9 Claims, 4 Drawing Sheets

SECURITY BRACKET FOR LAPTOP COMPUTERS

CROSS-REFERENCE TO RELATED APPLICATION

The present non-provisional patent application claims the benefit of and priority to U.S. Provisional Patent Application No. 62/891,891, filed Aug. 26, 2019, by Meir Avganim, and entitled "SECURITY BRACKET FOR LAPTOP COMPUTERS," the entire contents of which are incorporated herein by reference.

BACKGROUND OF THE INVENTION

The present invention generally relates to devices for inhibiting the theft of relatively small but expensive pieces of equipment such as computers, telephones and the like. More specifically, the present invention is directed to a theft preventing bracket or tab that can be attached to certain computers, tablets and the like, which do not have a built-in security slot, in which the security slot is formed in the bracket that is in turn attached to the body of the computer by the end user.

The present invention is directed to computer security locks, security slots and security brackets of the general types disclosed in U.S. Pat. Nos. 9,549,476 and 9,476,229, the contents of which are incorporated fully by reference herein.

Since the early 1990s, computer vendors have been providing security slots in portable electronic devices almost without exception. The instant inventors aforementioned and incorporated by reference U.S. Pat. No. 9,549,476 and the prior art documents cited therein reflect the highly developed state of technology associated with security slots and locks therefor.

Nonetheless, with the shrinking size of laptops, tablets and the like, recently some computer manufacturers have developed ultrathin-body laptops, tablets and other types of mobile devices in which they have opted not to provide a security slot. Consumers of these types of devices, on the other hand, prefer and some insist on being provided with a security slot.

The present invention is generally directed to a bracket or strip-style, add-on security device, of the type disclosed in the instant inventor's aforementioned U.S. Pat. No. 9,476,229 that ameliorates the problem ensuing from computer manufacturers providing laptops that lack security slots.

SUMMARY OF THE INVENTION

Accordingly, it is a general object of the present invention to provide a security bracket or strip that can be secured to very thin mobile devices such as tablets, notebooks or like device, in which there is formed a security slot into the which the locking elements of a conventional computer lock can be inserted to protect the mobile devices from theft.

It is a further object of the present invention to provide a flange or bracket like add-on device that can be either screwed to the underside of the tablet or mobile device requiring to be secured against theft, which defines in that tab the security slot, added at very little cost as an inexpensive accessory.

The foregoing and other objects of the invention are realized, according to preferred embodiments of the invention in conjunction with a security kit for retrofitting a mobile electronic device with a theft preventing security slot capable of locking therein a lock head that has attached thereto a cable, which cable is in turn attachable to a comparatively immovable object, wherein said mobile electronic device comprises a housing and a back cover plate held to the housing by a plurality of body screws passing through threaded openings of the cover plate. The security kit includes a security bracket having an attachment plate with a screw hole formed therein, and having a thickened portion having a security slot formed therein; and a fork-shaped screw extracting tool, the tool being sized and shaped to enable extracting from said mobile electronic device at least one of said body screws used to attach the back plate of the mobile device to the housing of said mobile device, wherein said body screw has a screw head and a shaft with a first smooth and threads-free section adjacent the screw head and a second threaded section integrally extending from the first section, said screw extracting tool being configured to enable removal of said body screw from said back plate, the placement of said attachment plate of said security bracket so that the screw hole thereof is in alignment with a corresponding threaded opening of the cover plate enabling the removed body screw to be re-screwed so that the security bracket becomes attached to the mobile electronic device.

Preferably, the screw head is angled and the fork-shaped screw extracting tool has a beveled distal section that is so constructed that when said tool is pushed under said screw head, said body screw is subject to a force in a direction to extract and remove it from said mobile device. The security bracket is provided with a single screw opening. The security slot in said security bracket has a 3×7 mm opening or alternatively, an internal trapezoidal shape for enabling a lock head to become wedged within a cavity formed in said security bracket.

Preferably, the security bracket attachment plate extends at a right angle to the thickened portion of said security bracket. A plurality of said security brackets may be provided to enable attachment of individual security brackets to a plurality of mobile electronic devices and the security kit including a single security cable with a plurality of lock heads, each being attachable to one of said security brackets. A plurality of support cushioning buttons are provided on said back plate to raise the back plate above a resting surface by a predetermined height and wherein said attachment plate has an associated thickness that is smaller than said height.

In a preferred method of the invention, the invention method includes retrofitting a mobile electronic device that lacks an anti-theft security slot by attaching thereto an externally provided security slot. The method includes providing a mobile electronic device with a housing open at a back side of said electronic mobile device, a back cover having a plurality of cushioning buttons and a plurality of screw openings, a plurality of screws having angled heads countersunk at the screw openings of the back cover, and including a plurality of body screws that have a shaft with a first smooth section and an integrally following threaded section, the threaded section being configured to be screwed initially through a threaded openings of the back cover and thereafter into the housing; providing a security bracket having an attachment plate with a screw hole formed therein and having a thickened portion having a security slot formed therein; providing a fork-shaped screw extracting tool, the tool being sized and shaped to enable extracting from said mobile electronic device at least one of said body screws used to attach the back plate of the mobile device to the housing; deploying the fork-shaped screw extracting tool to remove at least one of said body screws; and placing the attachment plate of the security bracket in alignment with the screw hole formed therein and one of said openings in said back cover and re-installing said removed body screw in a manner that mechanically secures the security bracket to said housing. Preferably, the security bracket is attached adjacent a front end of said mobile electronic device.

Other features and advantages of the present invention will become apparent from the following description of the invention which refers to the accompanying drawings.

DETAILED DESCRIPTION OF EMBODIMENTS OF THE INVENTION

Figure 1:
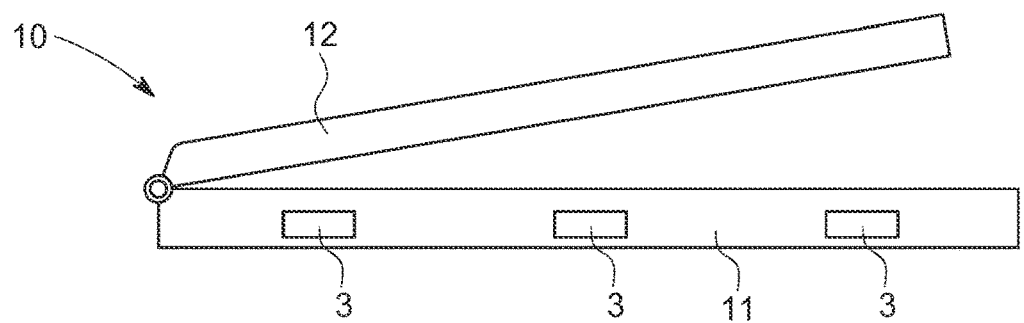
FIG. 1 is a first perspective of a conventional laptop computer to which the flange or bracket of the present invention can be attached.
Figure 2:
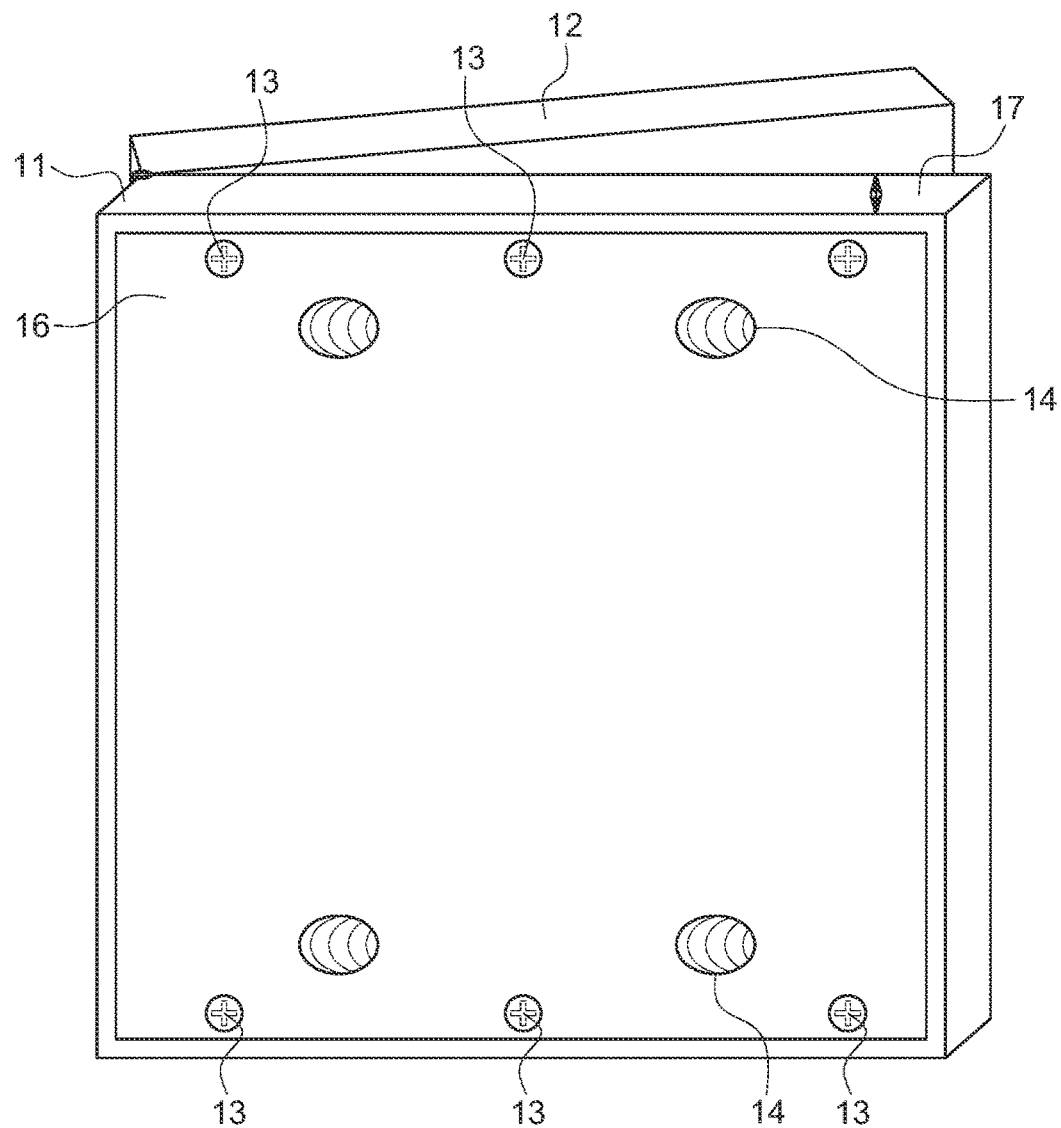
FIG. 2 is a second perspective that shows the laptop computer of FIG. 1 from a bottom side thereof.

Referring to the drawings, prior art FIG. 1 shows a conventional laptop computer 10 that has a body 11 with a hingedly-connected display 12, with various communication ports 3. In FIG. 2, the bottom side of the laptop 10 is shown to include a plurality of body screws 13 located along a right side and a left side of the body 11, which hold that body mechanically fastened. The underside of the body 11 also has soft leveling, typically made of rubber, buttons 14 that assure stable resting of the laptop 10 on a flat surface. The body thickness 17 of the main top body 11 is indicated by the letter "d" and is typically a few millimeters in width, e.g., about 10 mm.

Figure 3:
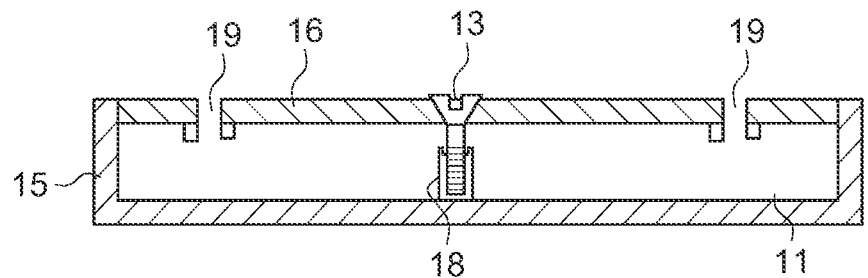
FIG. 3 is a cross-section through the laptop of FIG. 2.

Referring to FIG. 3, a bottom plate 16 associated with a body 11 is secured to a bottom housing 15 of the laptop 10 by a plurality of the aforementioned body screws 13. The housing 15 has a plurality of screw receiving studs 18 only one of which is shown in FIG. 3 and which are designed to receive the body holding screws 13 which penetrate through openings 19. The screws 13 have an enlarged angled head for being countersunk into the bottom cover/plate, with an initial section 13a that is flat, i.e., smooth and thread free, and a threaded section 13b. The openings 19 are also threaded, so that when the screw 13 is inserted, it is initially turned until the threaded section 13b passes through the opening 19. In this state, the screws will not fall out even when the plate 16 is turned upside down. When placed in the right orientation, the screws 13 are further turned and the plate 16 becomes securely mounted to the studs 18 in a reliable manner. Note that these screws are ultra-small, millimeter sized, and that the need to remain connected to the plate, to avoid being lost. Hence, the need for screws that are initially smooth and then treaded. The foregoing describes one style of computer currently being marketed by the Dell Corporation. This laptop computer is not provided with any security slot.

Figure 5:
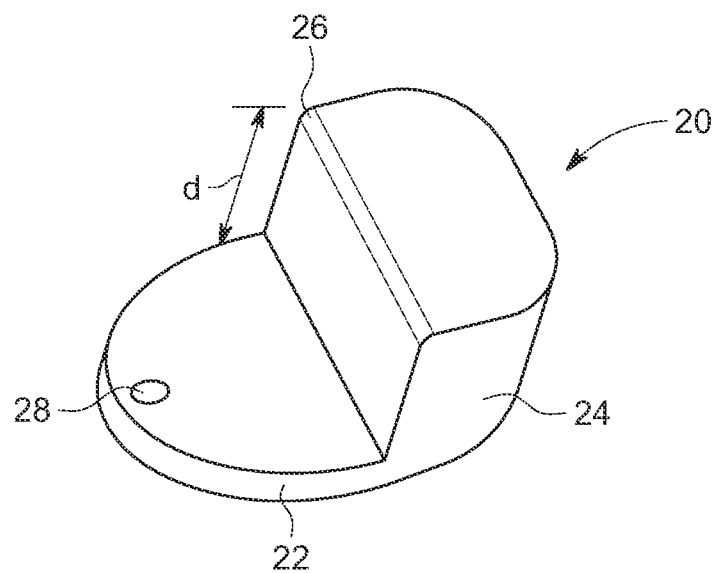
FIG. 5 is a perspective of a security tab/bracket in accordance with the present invention.
Figure 6:
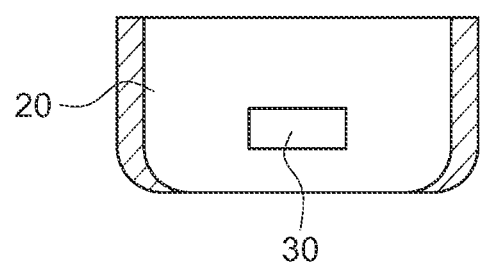
FIG. 6 is a rear view of FIG. 5 showing the entrance opening into the security slot formed in the tab/flange.

In accordance with the present invention and for end users that insist on being provided with a security, theft-preventing feature, the present invention provides the tab or flange 20 shown in FIG. 5 which has a flat ultrathin base 22 with a screw opening 28 and a thickened body 24 that extends at a right angle to the base 22. The height of the thickened body 24 is "d" which is generally of the same measurement as the thickness "d" 17 of the laptop body 11. The thickened body 24 also has a very slightly protruding lip 26. Inside the body and as seen from FIG. 6 is defined or formed a security slot which can be the trapezoidal security slots described in the incorporated by reference patents or any type of security slot, e.g., the conventional 3×7 mm security slot.

Figure 5A:
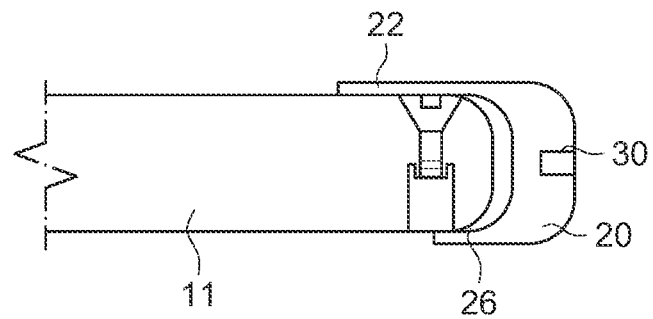
FIG. 5A shows the security bracket attached to the laptop of FIG. 2, in accordance with the present invention.

In accordance with the present invention, the security tab 20 is intended to be connected to the laptop 10, as shown in FIG. 5A, by being secured to the side wall of the laptop base 11, using one of the locations of the screws 13 to be affixed thereto. The attached security tab 20 is shown in FIG. 5.

A difficulty that would be encountered by an end user is that the end user would either have to remove all six screws 18 to remove the bottom in order to extract one of the screws 13 from its location. This is due to the fact that the screw 13 has the flat 13a section which when loosened would not make it easy for a person to unthread the screw 13 completely, without simultaneously also pulling on the head while engaged in the unscrewing action.

Figure 4:
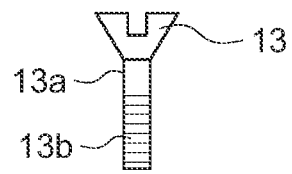
FIG. 4 shows a conventional screw that is utilized in the laptop of FIG. 1.
Figure 7:
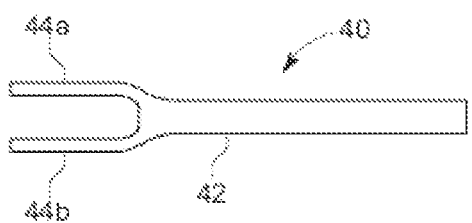
FIG. 7 shows a screw extraction tool in accordance with the present invention.
Figure 8:
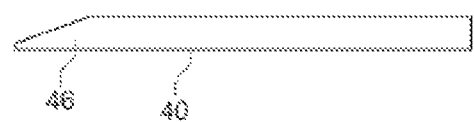
FIG. 8 shows the screw-extracting tool of FIG. 7 as an elevational view.

The present invention solves the problem by providing users, not only the security tab 20, but also the screw-removing tool 40 shown in FIG. 7. The tool has a handle 42 and a fork section with prongs 44a and 44b. Therefore, when the screw 13 (see FIG. 4) is being turned to be removed, it will rise until it clears the threads of the stud 18, but still will not be removable. However, the fork-end of the tool 40 can be inserted and pushed under the head of the screw 13 while at the same time continuing to turn out the screw 13. As the tool is pushed harder under the screw head, it will cause the screw to rise and catch the internal threads in the screw hole opening 19.

At this point, once one of the screws 13 has been completely removed, it can be utilized again or another screw can be provided that is re-inserted by being first inserted through the opening 28 in the tab 20 and then reconnected to the laptop, securing the tab 20 to the laptop 10 with the lip 26 partially holding onto the laptop from above. In this state, an end user can connect his security lock with its lock head that has locking elements that can be inserted into the slot 30 shown in FIG. 6 herein.

Given that there are a plurality of screws 13, it would be evident to one of ordinary skill in the art that the security tab of FIG. 24 can also be utilized by providing several such tabs being connected and thereby allowing two or three laptops to be tethered to one another and secured together, using only a single cable of the type disclosed in the incorporated by reference U.S. Pat. No. 9,549,476.

Figure 9:
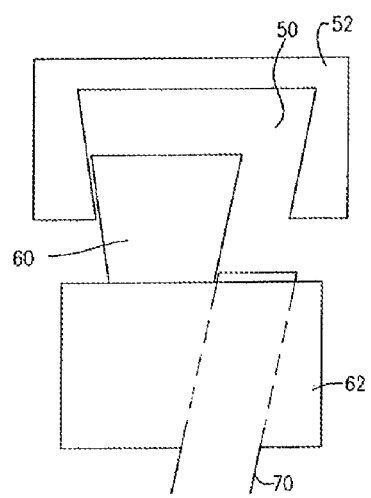
FIG. 9 shows a conventional trapezoid or wedge security slot.

FIG. 9 shows the wedge slot of the incorporated by reference U.S. Pat. No. 9,549,476. The slot 52 has a trapezoid shape cross section 50, configured to receive and hold the locking elements 60 and 70 of the lock body 62.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A security kit for retrofitting a mobile electronic device with a theft preventing security slot capable of locking therein a lock head that has attached thereto a cable, which cable is in turn attachable to a comparatively immovable object, wherein said mobile electronic device comprises a housing and a back cover plate held to the housing by a plurality of body screws passing through threaded openings of the cover plate, the security kit comprising:

a security bracket having an attachment plate with a screw hole formed therein, and having a thickened portion having a security slot formed therein; and a fork-shaped screw extracting tool, the tool being sized and shaped to enable extracting from said mobile electronic device at least one of said body screws used to attach the back plate of the mobile device to the housing of said mobile device, wherein said body screw has a screw head and a shaft with a first smooth and threads-free section adjacent the screw head and a second threaded section integrally extending from the first section, said screw extracting tool being configured to enable removal of said body screw from said back plate, the placement of said attachment plate of said security bracket so that the screw hole thereof is in alignment with a corresponding threaded opening of the cover plate enabling the removed body screw to be re-screwed so that the security bracket becomes attached to the mobile electronic device.

2. The security kit of claim 1, wherein said screw head is angled and wherein the fork-shaped screw extracting tool has a beveled distal section that is so constructed that when said tool is pushed under said screw head, said body screw is subject to a force in a direction to extract and remove it from said mobile device.

3. The security kit of claim 1, wherein said security bracket is provided with a single screw opening.

4. The security kit of claim 1, wherein the security slot in said security bracket has a 3×7 mm opening.

5. The security kit of claim 1, wherein said security slot has an internal trapezoidal shape for enabling a lock head to become wedged within a cavity formed in said security bracket.

6. The security kit of claim 1, wherein said security bracket attachment plate extends at a right angle to the thickened portion of said security bracket.

7. The security kit of claim 1, including a plurality of support cushioning buttons provided on said back plate to raise the back plate above a resting surface by a predetermined height and wherein said attachment plate has an associated thickness that is smaller than said height.

8. A method of retrofitting a mobile electronic device that lacks an anti-theft security slot by attaching thereto an externally provided security slot, said method comprising:

providing a mobile electronic device with a housing open at a back side of said electronic mobile device, a back cover having a plurality of cushioning buttons and a plurality of screw openings, and including a plurality of body screws that have a shaft with a first smooth section and an integrally following threaded section, the threaded section being configured to be screwed initially through a threaded openings of the back cover and thereafter into the housing;

providing a security bracket having an attachment plate with a screw hole formed therein and having a thickened portion having a security slot formed therein;

providing a fork-shaped screw extracting tool, the tool being sized and shaped to enable extracting from said mobile electronic device at least one of said body screws used to attach the back plate of the mobile device to the housing;

deploying the fork-shaped screw extracting tool to remove at least one of said body screws; and placing the attachment plate of the security bracket in alignment with the screw hole formed therein and one of said openings in said back cover and re-installing said removed body screw in a manner that mechanically secures the security bracket to said housing.

9. The method of claim 8, including attaching said security bracket adjacent a front end of said mobile electronic device.

* * * * *